3,778,391
PROCESS FOR CONCENTRATING AQUEOUS COLLOIDAL DISPERSIONS OF POLYTETRAFLUOROETHYLENE

Paul S. Morris, Acton, Mass., and Robert H. Hutzler, Chatham, N.J., assignors to Allied Chemical Corporation, New York, N.Y.
No Drawing. Filed Feb. 24, 1972, Ser. No. 229,190
Int. Cl. C08d 9/06
U.S. Cl. 260—17.4 ST          6 Claims

ABSTRACT OF THE DISCLOSURE

In the creaming process for concentrating dilute aqueous colloidal dispersions of polytetrafluoroethylene, using as creaming agent naturally-occurring water-soluble colloids, in the presence as stabilizer of non-ionic surface active agent to obtain a concentrated dispersion phase and a supernatant aqueous phase, followed by phase separation, viscosity of the resultant concentrated dispersion is reduced, without concomitant loss in stability, by a process improvement which comprises adding aqueous hydrogen peroxide to the dispersions to be creamed in amount of about 2 to 20 parts by weight per 100 parts of creaming agent.

SUMMARY OF THE INVENTION

The present invention relates to an improvement in a process for concentrating aqueous colloidal dispersions of polytetrafluoroethylene to obtain dispersions of higher solids content than obtainable as the product of polymerization of tetrafluoroethylene monomer in aqueous dispersion in the presence as dispersing agent of polyfluorinated carboxylic acid or alkali metal or ammonium salts thereof.

In the process for concentrating aqueous colloidal dispersions of polytetrafluoroethylene by (1) adjusting the pH of an aqueous colloidal dispersion of polytetrafluoroethylene having a polymer solids content in the range of from about 10 to about 50 percent by weight, usually containing a small amount of polyfluorinated carboxylic acid or ammonium salts thereof as dispersing agent, to a value of between about 5 and 13 by adding a base or acid, if required;
(2) adding as stabilizing agent a non-ionic surfactant having the structural formula

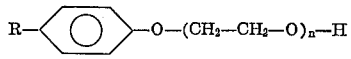

wherein R is an alkyl radical, straight chain or branched, having from 8 to 12 carbon atoms and $n$ is an integer of from 6 to about 12, in amount sufficient to incorporate in the dispersion 1 to 10 parts by weight of the stabilizing agent per 100 parts of polymer;
(3) adding as creaming agent a naturally-occurring water-soluble colloid selected from the group consisting of locust bean gum, gum tragacanth, ammonium alginate, sodium alginate and potassium alginate in amount of between about 0.001 and about 5 parts by weight per 100 parts of polymer;
(4) allowing the dispersion to separate into a concentrated dispersion phase and a supernatant aqueous phase; and
(5) recovering the concentrated dispersion phase;

viscosity of the resultant dispersion is reduced without concomitant adverse effect on dispersion stability by the improvement which comprises: adding aqueous hydrogen peroxide solution containing at least about 3 percent by weight of hydrogen peroxide concurrently with or following addition of the creaming agent in amount of between about 2 and 20 parts by weight of hydrogen peroxide, basis 100 percent $H_2O_2$, per 100 parts added creaming agent.

The concentrated aqueous colloidal dispersion of polytetrafluoroethylene thus obtained may generally contain up to about 80 percent by weight of solid polymer particles. As compared to concentrated colloidal dispersions of polytetrafluoroethylene obtained by the above-described method, but omitting addition of aqueous hydrogen peroxide, the dispersions made by the invention process have substantially lower viscosity without loss in stability, and without sacrifice in any other properties, so that they may be stored for extended periods of time without significant settling of solids or other adverse effects. Lower viscosities at equal polymer solids content in concentrated aqueous colloidal dispersions of polytetrafluoroethylene are highly desirable if the dispersion is intended for compounding with solid additives such as pigments, and especially if it is to be used for coating fabrics, such as glass cloth, since lower viscosities give better flow of the dispersion, hence give more even distribution of the polymer on the cloth. It is unexpected and surprising that the reduction in viscosity obtained by the improved method of the present invention does not lead to a concomitant loss in stability because it is well known that in aqueous dispersions of solids, other things being equal, reduction of viscosity generally leads to higher settling rates for the dispersed solid particles, hence, lower stability of the dispersion.

BACKGROUND OF THE INVENTION

Methods for making aqueous colloidal dispersions of polytetrafluoroethylene by polymerizing tetrafluoroethylene in aqueous dispersion in the presence as dispersing agent of polyfluorinated carboxylic acids and alkali metal or ammonium salts thereof are known (cf., e.g., U.S. Pat. 2,559,750 to Berry et al.).

Methods for creaming aqueous colloidal dispersions of polytetrafluoroethylene to obtain more concentrated dispersions have, e.g., been described in U.S. Pat. 3,037,953 to Marks et al., U.S. Pat. 3,301,807 to Hoashi, U.S. Pat. 2,878,196 to Buffington, and British Pat. 1,189,483 of Montecatini Edison S.p.A.

U.S. Pat. 2,783,196 to Buffington describes a method for creaming aqueous colloidal dispersions of perfluorohaloolefins, including polytetrafluoroethylene, which involves admixing the dispersion as obtained from the polymerization after adjustment of pH, as required, to between about 5 and 13, with a creaming agent of naturally-occurring water-soluble colloids such as locust bean gum, gum tragacanth, ammonium alginate, sodium alginate and potassium alginate, or with methyl cellulose, in certain proportions with respect to the polymer content of the dispersion, generally in the presence as stabilizing agent of organic hydrophilic stabilizers such as amphoteric, non-ionic or anionic surfactants, followed by phase separation and recovery of the concentrated dispersion phase.

The present invention provides an improvement on known processes for creaming aqueous colloidal dispersions of polytetrafluoroethylene resulting in concentrated dispersions having low viscosity without loss of stability.

DETAILED DESCRIPTION OF THE INVENTION

The starting materials for use in the process of the present invention are dilute aqueous colloidal dispersions of polytetrafluoroethylene, generally obtained by polymerization of tetrafluoroethylene in an agitated aqueous medium using water-soluble peroxide polymerization initiator and an ionizable dispersing agent, usually a salt having a solubility in water of at least 0.1 percent at 100° C. selected from the group consisting of alkali, ammonium and substituted ammonium salts of a polyfluoroalkanoic acid of the formula $B(CF_2)_nCOOH$ wherein B is hydrogen or fluorine and $n$ is an integer of from 6 to 20. Dilute colloidal dispersions of polytetrafluoroethylene suitable as starting material in the present invention generally contain from about 5 to about 50 percent by weight of tetrafluoroethylene polymer solids, more usually about 15 to 30 percent by weight of such solids. Also suitable for use in the invention process are dispersions of polytetrafluoroethylene which have already been subjected to treatment to increase polymer solids content.

Dilute aqueous colloidal dispersions of polytetrafluoroethylene as obtained from the polymerization process have a pH value between about 3 and about 13, depending on the polymerization recipe employed. If the pH of the dilute aqueous colloidal dispersion to be concentrated by the method of the present invention is below about 5, then it is adjusted to a value of between about 5 and 13, more preferably to a value of between about 6 and 9 by adding a base, such as alkali metal hydroxides, phosphates or acid phosphates, or suitable buffers. If the pH of the dilute aqueous colloidal dispersion is above about 13, then it is suitably reduced to within the above-stated ranges by addition of acids, such as dilute mineral acids, or buffers.

Dilute aqueous colloidal dispersions of polytetrafluoroethylene as obtained from the above-described polymerization process contain small amounts, e.g., 0.2 to about 5 percent by weight of dispersing agent of the type above described. While these amounts of dispersing agent offer some protection against coagulation, they are insufficient to afford long-term stability of the dispersion and, in particular, they are insufficient to protect the dispersion against coagulation during creaming. Hence, it is necessary to add a stabilizing agent to the dispersion prior to creaming.

Stabilizing agents suitable for use in the improved process of the present invention are non-ionic surfactants having the structural formula

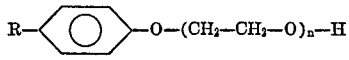

wherein R is an alkyl radical, straight chain or branched, having from 8 to 12 carbon atoms and $n$ is an integer of from 6 to about 12. Non-ionic surfactants having the above formula, which may be referred to as alkyl phenoxy polyoxyethylene glycols, are commercially available products. Specific examples of preferred stabilizing agents for use in the improved method of the present invention include non-ionic surfactants having the formulas

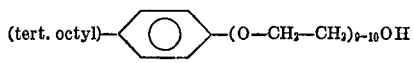

(sold by Rohm and Haas Company as "Triton X–100") and

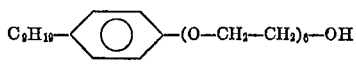

The stabilizing agent is preferably added to the dilute aqueous colloidal dispersion to be concentrated in form of an aqueous solution, suitably containing up to about 40 percent by weight of the stabilizing agent, more preferably between about 5 and 20 percent by weight of the stabilizing agent. If the stabilizing agent is added neat, or in solution containing substantially more than about 40 percent by weight of the stabilizing agent, local irreversible coagulation of the dispersion may occur. It is ordinarily not perferred to use solutions containing less than about 5 percent by weight of stabilizing agent because excess added water may adversely affect the creaming operation.

The stabilizing agent is suitably added to the dispersion in amount of 1 to 10 parts by weight per 100 parts of polymer. Lesser amounts are ordinarily not sufficient to provide desired degree of protection against coagulation; use of larger amounts serves no useful purpose, but tends to increase viscosity of the concentrated product, hence is preferably avoided. Preferably, the stabilizing agent is employed in amount of from 2 to 8 parts by weight per 100 parts of polymer, more preferably in amount of 3 to 5 parts. To some extent the amount of stabilizing agent required to provide protection against coagulation during creaming will depend on amount of polyfluorinated carboxylic acid dispersing agent present in the dispersion, and also on the size of the polytetrafluoroethylene particles. In any event, optimum amounts within the above-stated limits may readily be determined by one skilled in the art with minimum experimentation.

Creaming agents suitable for use in the improved process of the present invention include naturally-occurring water-soluble colloids selected from the group consisting of locust bean gum, gum tragacanth, ammonium alginate, sodium alginate and potassium alginate. Of these, the readily commercially available ammonium alginate is preferred. Ammonium alginate suitable for use in the invention process has molecular weight ranging from about 10,000 to about 300,000, preferably from about 30, 000 to about 50,000. The creaming agent, like the stabilizing agent, is suitably added to the dilute aqueous dispersion in form of an aqueous solution, suitably containing between about 0.5 and about 5 percent by weight of creaming agent, more preferably between about 1 and 3 percent by weight.

The creaming agent is employed in amount of between 0.001 and about 5 parts by weight, preferably between about 0.1 and about 3 parts by weight per 100 parts of polymer.

Procedurally, concentration of dilute aqueous dispersions of polytetrafluoroethylene in accordance with the method of the present invention involves first adjusting the dispersion to desired pH by addition of base or acid, as required, followed by addition of the stabilizing agent and the creaming agent, preferably in that order, although if desired, though not ordinarily preferred, pH adjustment may follow addition of the stabilizing agent. Also, stabilizing agent and creaming agent may be added concurrently. Hydrogen peroxide is added concurrently with or subsequently to the creaming agent. Preferably, the additives are incorporated into the dispersion with gentle stirring, at temperatures ranging from about 5 to about 95° C., preferably from about 20 to about 60° C. The dispersion is then allowed to stand substantially undisturbed for a period of time sufficient to allow formation of a concentrated dispersion phase and a supernatant, substantially clear aqueous phase.

Time required to obtain phase separation depends on factors such as particle size of the polymer solids, particle size distribution, solids content of the dispersion, as well as amount of stabilizing agent and creaming agent employed. Ordinarily, that time will range from about 8 to about 80 hours. If desired, that time may be shortened by subjecting the dispersion to artificial gravity forces, such as in a centrifuge. Phase separation is allowed to take place at temperatures ranging from about 15 to about 50° C.

The lower liquid phase containing the concentrated dispersion of polymer is separated by decantation or any other convenient method. It contains up to about 80 percent by weight of solid polymer particles. If desired, the concentrated dispersion may be adjusted to a standard polymer solid content, say between 60 and 75 percent by weight, by addition of water.

The following examples and tests further illustrate the present invention and set forth the best mode contemplated for its practice. They are not to be interpreted as a limitation thereon.

EXAMPLE 1

To 400 ml. of an aqueous dispersion of colloidal size polytetrafluoroethylene of 21.4 percent by weight polymer solids content is added dilute aqueous amonia in amount sufficient to adjust the pH to 8, followed by 40 ml. of a 20 percent by weight aqueous solution of non-ionic surfactant having the formula

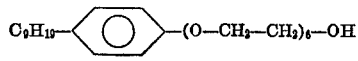

150 ml. of a 1 percent by weight aqueous solution of ammonium alginate (molecular weight about 40,000), and 6 ml. of 30 percent aqueous hydrogen peroxide. After gentle stirring to effect blending of ingredients, the mixture is allowed to stand at ambient temperature (about 22° C.) to allow formation of a concentrated dispersion phase and a substantially clear supernatant aqueous phase. The phases are separated by decantation. The concentrated dispersion phase contains 62 percent by weight of polymer solids. It is adjusted to 60 percent by weight of polymer solids content by addition of deionized water. So adjusted, it has a viscosity of 100 cp., determined at 22° C. using a Brookfield viscosimeter (Model LVF) with a number 2 spindel at 60 r.p.m.

A portion of the concentrated dispersion is subjected to centrifugation in a laboratory centrifuge, using a tared 15 ml. graduated centrifuge tube, to a centrifugal force of 400 g. for a period of 1½ hours. On decantation of the supernatant liquid, the tube contains 1.4 grams of solid polymer residue.

COMPARATIVE EXPERIMENT 1

Example 1 is repeated using the same starting material and additives, except that addition of 30 percent aqueous hydrogen peroxide solution is omitted. The concentrated dispersion phase so obtained is adjusted to contain 60 percent by weight of polymer solids. So adjusted, it has a viscosity of 280 cp., determined as in Example 1. On centrifugation of a portion of the concentrated dispersion as described in Example 1, the centrifuge tube contains 2 grams of solid polymer residue.

EXAMPLE 2

Example 1 is repeated using the same starting material, but substituting a non-ionic surfactant of formula

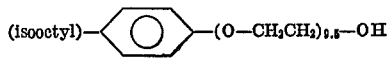

for the surfactant employed in Example 1. The concentrated dispersion, adjusted to polymer solids content of 60 percent by weight by addition of deionized water, has a Brookfield viscosity, determined as in Example 1, of 25 cp. On centrifugation, as in Example 1, the centrifuge tube contains 2.7 grams of solid polymer residue.

When the procedures of the above examples are repeated using as stabilizing agent other non-ionic surfactants and/or creaming agents within the purview of the present invention, similar results are obtained, that is to say, concentrated aqueous dispersions of polytetrafluoroethylene are obtained which, as compared to those obtained by identical procedure, but omitting addition of hydrogen peroxide, have substantially lower viscosity without loss in stability.

Since various changes and modifications may be made in the invention without departing from the spirit and essential characteristics thereof, it is intended that all matter contained in the above description shall be interpreted as illustrative only, the invention being limited only by the scope of the appended claims.

We claim:

1. In the process for concentrating aqueous colloidal dispersion of polytetrafluoroethylene by (a) adjusting the pH of an aqueous colloidal dispersion of polytetrafluoroethylene having a polymer solids content in the range of from about 10 to about 50 percent by weight to a value of between about 5 and 13 by adding a base or acid, if required;

(b) adding as stabilizing agent a non-ionic surfactant having the structural formula

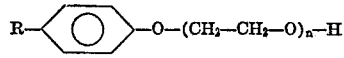

wherein R is an alkyl radical, straight chain or branched, having from 8 to 12 carbon atoms and $n$ is an integer of from 6 to about 12, in amount sufficient to incorporate in the dispersion 1 to 10 parts by weight of the stabilizing agent per 100 parts of polymer;

(c) adding as creaming agent a naturally-occurring water-soluble colloid selected from the group consisting of locust bean gum, gum tragacanth, ammonium alginate having molecular weight ranging from about 10,000 to about 300,000, sodium alginate and potassium alginate in amount of between about 0.001 and about 5 parts by weight per 100 parts of polymer;

(d) allowing the dispersion to separate into a concentrated dispersion phase and a supernatant aqueous phase; and (e) recovering the concentrated dispersion phase;

the improvement which comprises:

adding aqueous hydrogen peroxide solution containing at least about 3 percent by weight of hydrogen peroxide to the dispersion concurrently with or following addition of the creaming agent in amount of between about 2 to 20 parts by weight of hydrogen peroxide, basis 100 percent $H_2O_2$, per 100 parts added creaming agent.

2. The process of claim 1 wherein the creaming agent is ammonium alginate.

3. The process of claim 2 wherein the stabilizing agent has the structural formula

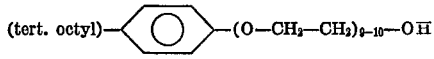

4. The process of claim 2 wherein the stabilizing agent has the structural formula

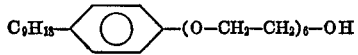

5. The process of claim 1 wherein the creaming agent is ammonium alginate having a molecular weight ranging from 30,000 to 50,000, and wherein the stabilizing agent has the structural formula

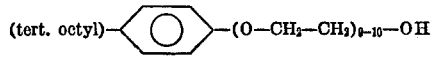

6. The process of claim 1 wherein the creaming agent is ammonium alginate having a molecular weight ranging from 30,000 to 50,000, and wherein the stabilizing agent has the structural formula

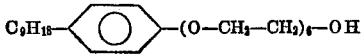

References Cited
UNITED STATES PATENTS

| | | | |
|---|---|---|---|
| 2,878,196 | 3/1959 | Buffington | 260—17.4 |
| 2,883,351 | 4/1959 | Uraneck | 260—17.4 |
| 3,373,126 | 3/1968 | Lehman | 260—17.4 |

WILLIAM H. SHORT, Primary Examiner

E. WOODBURY, Assistant Examiner